US010856357B2

(12) United States Patent
Bergquist et al.

(10) Patent No.: US 10,856,357 B2
(45) Date of Patent: Dec. 1, 2020

(54) SYSTEMS AND METHODS OF DISCONTINUOUS OPERATION FOR WIRELESS DEVICES

(71) Applicant: Telefonaktiebolaget L M Ericsson (publ), Stockholm (SE)

(72) Inventors: Gunnar Bergquist, Kista (SE); David Better, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 826 days.

(21) Appl. No.: 14/895,293

(22) PCT Filed: Oct. 26, 2015

(86) PCT No.: PCT/EP2015/074728
§ 371 (c)(1),
(2) Date: Dec. 2, 2015

(87) PCT Pub. No.: WO2016/074913
PCT Pub. Date: May 19, 2016

(65) Prior Publication Data
US 2016/0295637 A1 Oct. 6, 2016

Related U.S. Application Data

(60) Provisional application No. 62/079,039, filed on Nov. 13, 2014.

(51) Int. Cl.
H04W 74/08 (2009.01)
H04W 76/28 (2018.01)
(Continued)

(52) U.S. Cl.
CPC .......... H04W 76/28 (2018.02); H04W 24/08 (2013.01); H04W 74/0833 (2013.01); H04W 76/00 (2013.01); H04W 76/27 (2018.02)

(58) Field of Classification Search
CPC . H04W 76/048; H04W 76/02; H04W 74/002; H04W 74/006; H04W 74/0833; H04W 76/046
See application file for complete search history.

(56) References Cited

U.S. PATENT DOCUMENTS 8,594,747 B2    11/2013  Shukla et al.
2010/0111010 A1  5/2010   Wu
(Continued)

FOREIGN PATENT DOCUMENTS

CN    101534545 A    9/2009
CN    103999515 A    8/2014
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.5.0, Sep. 1, 2013, pp. 1-288, 3GPP, France.

Primary Examiner — Romani Ohri
(74) Attorney, Agent, or Firm — Coats & Bennett, PLLC

(57) ABSTRACT

Systems and methods of discontinuous operation for wireless devices are provided. In one exemplary embodiment, a method may include preconfiguring (1501), by a user equipment (UE) (1012), the UE for discontinuous receive (DRX) operation in a connected state. The DRX operation may include modes of DRX operation of the UE with each mode corresponding to a level of connectivity of the UE. Further, while (1503) the UE is in the connected state, the method may include determining (1505), by the UE, the level of connectivity of the UE and sending (1507), by the UE, to a network node, a request for the DRX operation. Also, the (Continued)

request may include an indication of the level of connectivity of the UE.

25 Claims, 16 Drawing Sheets

(51) Int. Cl.
    *H04W 76/27* (2018.01)
    *H04W 76/00* (2018.01)
    *H04W 24/08* (2009.01)

(56) References Cited

U.S. PATENT DOCUMENTS

| | | | |
|---|---|---|---|
| 2010/0130137 A1* | 5/2010 | Pelletier | H04W 72/04 455/68 |
| 2013/0148521 A1 | 6/2013 | Sammour et al. | |
| 2014/0018085 A1 | 1/2014 | Young et al. | |
| 2014/0036748 A1 | 2/2014 | Mukherjee et al. | |
| 2014/0064134 A1 | 3/2014 | Huang et al. | |
| 2014/0204815 A1 | 7/2014 | Ismail et al. | |
| 2014/0269459 A1* | 9/2014 | Fan | H04W 74/02 370/294 |
| 2014/0334439 A1* | 11/2014 | Bontu | H04W 72/1289 370/331 |
| 2015/0173104 A1* | 6/2015 | Takahashi | H04W 4/22 370/329 |
| 2015/0201375 A1* | 7/2015 | Vannithamby | H04W 24/02 370/311 |
| 2015/0327324 A1* | 11/2015 | Wei | H04W 52/0235 370/280 |
| 2016/0143052 A1* | 5/2016 | Yilmaz | H04W 72/1263 370/329 |
| 2016/0255665 A1* | 9/2016 | Futaki | H04W 72/0406 370/329 |
| 2016/0294531 A1* | 10/2016 | Loehr | H04W 72/0413 |

FOREIGN PATENT DOCUMENTS

| | | |
|---|---|---|
| EP | 2582197 A2 | 4/2013 |
| WO | 2013184050 A1 | 12/2013 |
| WO | 2014039853 A1 | 3/2014 |
| WO | 2014109930 A1 | 7/2014 |

\* cited by examiner

```
DRX-Config ::=      CHOICE {
    release             NULL,
    setup               SEQUENCE {
        onDurationTimer     ENUMERATED {
            psf1, psf2, psf3, psf4, psf5, psf6,
            psf8, psf10, psf20, psf30, psf40,
            psf50, psf60, psf80, psf100,
            psf200},
        drx-InactivityTimer     ENUMERATED {
            psf1, psf2, psf3, psf4, psf5, psf6,
            psf8, psf10, psf20, psf30, psf40,
            psf50, psf60, psf80, psf100,
            psf200, psf300, psf500, psf750,
            psf1280, psf1920, psf2560, psf0-v1020,
            spare9, spare8, spare7, spare6,
            spare5, spare4, spare3, spare2,
            spare1},
        drx-RetransmissionTimer ENUMERATED {
            psf1, psf2, psf4, psf6, psf8, psf16,
            psf24, psf33},
```

FIG. 4 (PRIOR ART)

onDurationTimer            ENUMERATED {
                               psf1, psf2, psf3, psf4, psf5, psf6,
                               psf8, psf10, psf20, psf30, psf40,
                               psf50, psf60, psf80, psf100,
                               psf200},

```
longDRX-CycleStartOffset    CHOICE {
    sf10                    INTEGER(0..9),
    sf20                    INTEGER(0..19),
    sf32                    INTEGER(0..31),
    sf40                    INTEGER(0..39),
    sf64                    INTEGER(0..63),
    sf80                    INTEGER(0..79),
    sf128                   INTEGER(0..127),
    sf160                   INTEGER(0..159),
    sf256                   INTEGER(0..255),
    sf320                   INTEGER(0..319),
    sf512                   INTEGER(0..511),
    sf640                   INTEGER(0..639),
    sf1024                  INTEGER(0..1023),
    sf1280                  INTEGER(0..1279),
    sf2048                  INTEGER(0..2047),
    sf2560                  INTEGER(0..2559)
}
```

```
PCCH-Config ::=         SEQUENCE {
    defaultPagingCycle      ENUMERATED {
                                rf32, rf64, rf128, rf256},
```

The IE *TimeAlignmentTimer* is used to control how long the UE considers the serving cells belonging to the associated TAG to be uplink time aligned. Corresponds to the Timer for time alignment in TS 36.321 [6]. Value in number of sub-frames. Value sf500 corresponds to 500 sub-frames, sf750 corresponds to 750 sub-frames and so on.

*TimeAlignmentTimer* information element

```
-- ASN1START

TimeAlignmentTimer ::=      ENUMERATED {
                              sf500, sf750, sf1280, sf1920, sf2560, sf5120,
                              sf10240, infinity}

-- ASN1STOP
```

```
-- ASN1START

SchedulingRequestConfig ::=     CHOICE {
    release                         NULL,
    setup                           SEQUENCE {
        sr-PUCCH-ResourceIndex          INTEGER (0..2047),
        sr-ConfigIndex                  INTEGER (0..157),
        dsr-TransMax                    ENUMERATED {
            n4, n8, n16, n32, n64, spare3, spare2, spare1}
    }
}

SchedulingRequestConfig-v1020 ::= SEQUENCE {
    sr-PUCCH-ResourceIndexP1-r10    INTEGER (0..2047)       OPTIONAL        -- Need OR
}

-- ASN1STOP
```

FIG. 9 (PRIOR ART)

SYSTEMS AND METHODS OF DISCONTINUOUS OPERATION FOR WIRELESS DEVICES

This application claims priority to U.S. Provisional Pat. App. No. 62/079,039, filed Nov. 13, 2014, which is hereby incorporated by reference as if fully set forth herein.

FIELD OF DISCLOSURE

The present disclosure relates generally to the field of wireless communications, and in particular to discontinuous operation for wireless devices.

BACKGROUND

The technical background of this disclosure relates to the field of wireless communications and in particular to discontinuous operation for wireless devices such as Discontinuous Reception (DRX) operation in Long Term Evolution (LTE) Connected Mode with additional functions for improved battery saving performance where the user plane is classified as dormant. The user plane may be dormant when it is either inactive or contains background data such as when the data that needs to be transmitted is neither part of "eye-ball" content for the user nor part of Original Equipment Manufacturer (OEM) Service Level Agreement (SLA) contents.

A User Equipment (UE) is in an RRC_CONNECTED state when a Radio Resource Control (RRC) connection has been established. If that is not the case (i.e. no RRC connection is established), then the UE is in an RRC_IDLE state. The RRC states in LTE may be characterized as an RRC_IDLE state and an RRC_CONNECTED state. For an RRC_IDLE state, there is no UE context stored in a network node such as a base station. In one example, a base station may be an evolved Node B (eNB). Further, a default Idle Mode DRX operation is broadcast in system information. Also, a UE-specific Idle Mode DRX operation may be configured and the RRC_IDLE state may include UE controlled mobility. While in the RRC_IDLE state, the UE may acquire system information, monitor Physical Dedicated Control Channel (PDCCH) to detect incoming calls and system information changes, perform cell measurements and cell (re-) selection, and apply Idle Mode DRX operation if configured.

For the RRC_CONNECTED state, there is an RRC connection. Further, a UE context is stored in the eNB and a UE-specific Physical Uplink Control Channel (PUCCH) resource may be configured. Also, a UE-specific Connected Mode DRX operation may be configured and the RRC_CONNECTED state may include network controlled mobility. While in the RRC_CONNECTED state, the UE may: acquire system information; monitor PDCCH to detect incoming calls and system information changes; monitor PDCCH to determine if data is scheduled for it; send Scheduling Request (SR) on PUCCH if configured; transmit Internet Protocol (IP) packets to the network; receive IP packets from the network, perform cell measurements and measurement reporting; and apply Connected Mode DRX operation if configured.

DRX is an operation where UE discontinuously reads PDCCH. One of the purposes of DRX is to minimize the power duty cycles in the UE, thereby providing improved battery economy.

FIG. 1 illustrates an LTE system 100 with PDCCH alongside other downlink channels. LTE sends data on shared channels such as Physical Downlink Shared (data) Channel (PDSCH) and Physical Uplink Shared (data) Channel (PUSCH). The PDCCH is a 'meta tag' or a 'signed envelope' of the LTE physical data transmission. For instance, PDCCH provides the PDSCH, or PUSCH, allocation that describes how the system has structured the data. Further, PDCCH describes the function and for whom the data is intended.

The Radio Network Temporary Identifier (RNTI) is used on PDCCH to describe the function and for whom the data is intended, e.g. a response to some particular random access user(s), a page message for some group of UEs, or system information or other broadcast provided potentially for all UEs. There are different types of RNTIs. For instance, the P-RNTI is used to send paging to idle users and the C-RNTI identifies the UE uniquely within the common channels used in a cell.

FIG. 2 illustrates a DRX cycle 200 of PDCCH for a UE in Idle Mode. The UE is required to monitor PDCCH to detect P-RNTI and paging for incoming calls and system information changes. The paging may occur in certain subframes known as paging occasions 201, leaving the majority of subframes with relaxed opportunities for the power resources in the UE. The paging occasion 201 has a duration or length of one subframe and occurs with a defined offset and regularity which is specific for a UE or a group of UEs. The system may use a paging occasion 201 to page the UE by making PDCCH transmit a P-RNTI to address a concurrent paging message on PDSCH. The DRX cycle 200 of the UE is determined by the shortest of the UE-specific Idle Mode DRX operation values, if allocated by Non-Access Stratum (NAS) layers, and a default Idle Mode DRX operation value which is always broadcast in the system information. The default IDLE_MODE DRX operation value is applied if no UE-specific value has been configured.

FIG. 3 illustrates a DRX cycle 300 for a UE in Connected Mode. The UE is required to monitor PDCCH to detect paging for incoming calls and system information changes. The UE is also required to monitor PDCCH to determine if other dedicated data is scheduled for the UE. If DRX operation is configured, the scheduling of data may only occur in certain subframes that are part of Active Time. In FIG. 3, the Active Time occurs with occasions and defined regularity in a similar manner as that of paging occasions used in Idle Mode—it differs in that also the duration or length of each scheduling occasion may be configured. However, this regularity may be disrupted by activity. More specifically, the standard 3GPP TS 36.321 chapter 5.7 adds more subframes to the Active Time. When the DRX cycle 300 is configured, the Active Time includes the aggregate time while:

1. onDurationTimer 301 is running; or
2. a SchedulingRequest is sent on PUCCH (described for requesting UL-SCH resources for new transmission) and is pending (as long as a grant is not provided); or
3. drx-InactivityTimer or drx-RetransmissionTimer is running; or
4. mac-ContentionResolutionTimer (described for the random access procedure) is running; or
5. an uplink grant for a pending HARQ retransmission may occur and there is data in the corresponding HARQ buffer, or
6. a PDCCH indicating a new transmission addressed to the C-RNTI of the UE has not been received after successful reception of a Random Access Response for the preamble not selected by the UE (described for the random access procedure).

FIG. 4 shows an extract from the RRC Information Element (IE) DRX-Config (3GPP TS 36.331) 400 showing various standard timers involved to define Active Time in Connected Mode. These various standard timers involved to define the Active Time in Connected Mode include on DurationTimer, drx-lnactivityTimer, and drx-RetransmissionTimer.

The DRX operation in Connected Mode requires that the UE keeps a constant count, such as each and every subframe, of the Active Time. As discussed above, the Active Time is partly defined by a phase that occurs with a defined length and regularity which is similar to the DRX operation in Idle Mode. However, it is different in at least two aspects. First, the duration may be set and is typically configured to larger values than one PDCCH sub-frame (psf1), e.g., ~10 ms or larger. FIG. 5 shows the RRC IE onDurationTimer (3GPP TS 36.331) 500. In FIG. 5, the onDurationTimer may be set to larger values than one PDCCH sub-frame (psf1) such as to two PDCCH sub-frames (psf2).

Second, the reoccurring phase of Connected Mode DRX operation is different with respect to the period. In one example, FIG. 6 shows an extract from the RRC IE DRX-Config 600 (see 3GPP TS 36.331) where the period is ten milliseconds (10 msec.), twenty milliseconds (20 msec.), etc. In another example, FIG. 7 shows RRC IE PCCH-Config 700 (see 3GPP TS 36.331) where the period is by factors of three hundred and twenty milliseconds (320 msec.). The period of Connected Mode DRX operation is typically configured to be much smaller compared to the period of Idle Mode DRX operation (e.g. ~320 msec. or smaller compared to ~1280 msec. or larger).

The UE-specific PUCCH resource is always withdrawn (released) when the UE may no longer consider itself as time aligned to the uplink transmission structure. The eNB may use the RRC IE TimeAlignmentTimer to preconfigure the UE for that specific purpose. However, the eNB may also select a more direct and explicit way by using the value 'release' in the choice of RRC IE Scheduling-RequestConfig. The IE is listed as OPTIONAL with Need ON. It is typically set to 'release' when used in a handover message, with the intention to explicitly make it clear for the UE that the related PUCCH resource that was dedicated in the source cell cannot be used in the target cell.

FIG. 8 shows RRC IE TimeAlignmentTimer 800 (3GPP TS 36.331). FIG. 9 shows RRC IE SchedulingRequestConfig 900 with choice release (3GPP TS 36.331). It should be noted that although the PUCCH resource is released, the UE remains in the RRC_CONNECTED state.

There are obvious advantages in maintaining the UE in LTE Connected Mode. However, the DRX in LTE Connected Mode requires the UE to spend more power than is needed. This has been driven by a need to deliver data with less latency, shorter delay and higher throughput.

However, most of the concurrent traffic in modern networks is mobile internet traffic and as such Uplink (UL) triggered, e.g. an Application (APP) in UE sends a request over the 3GPP network to download some content from an internet server. There is a substantial amount of idle time in between such requests, in particular if the APP is running in the "background" of the user. Future networks may be dominated by the traffic from a large number of low complexity Machine Type Communication (MTC) devices, much of which may also be UL triggered. Such devices may rarely need to be reached but may need to regularly send a metric to an MTC server.

As previously described, there are differences in operation between DRX Idle Mode and DRX Connected Mode with regards to how the DRX opportunities are defined. The differences are explained for the situation in the RRC_CONNECTED state. The DL-SCH should promptly be used to schedule IP packets and the scheduler should have a freedom to prioritize between different bearers and UEs. The length, L, of the phase scales inversely with the capacity of the scheduler. The period of the on-duty phase scales with the delay-of-delivery requirement of the IP packets. The packet delivery delay requirement in turn scales with the latency required for the end-point APPs used.

Hence, the frequency, F, of the on-duty phase scales with the power consumed for that monitoring. Thus, the power consumed for PDCCH monitoring will be multiplied by the variables L and F. Further, if the user plane remains inactive for a longer time, there is a cost of staying in connected mode instead of transitioning to an idle mode.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

This disclosure describes methods and devices to achieve a coupling between DRX schemes and the required level of connectivity. More specifically, as soon as a PUCCH resource is released, e.g. as a result of "inactivity", and the UE must use the random access channel to send a request to be scheduled, it is as a first step designed and preconfigured to immediately start using a First Dormant DRX configuration. As a second and parallel step, the scheduler and resource management parts in the network node are adjusted for the use of such a First Dormant DRX configuration. As a third step, when the UE needs to send (and receive) data, the UE uses a part of the next UL scheduling grant to send an indication of its expected continued level of connectivity. As a fourth step, the network selects a DRX operation based on the indicated level of connectivity, and configures DRX in accordance with that level. As a fifth step, the UE uses the DRX configuration, and the network scheduler and resource management parts in the network node are adjusted for the same DRX configuration.

The device manufacturer or content provider (e.g. OEM) may be sure that the radio connectivity layer provides methods that are energy efficient. It is also fairly simple to describe the savings. The UE may reside in a dormant state which in terms of PDCCH monitoring is on par with that in RRC_IDLE state. At the same time, the UE may save the energy required to connect to the network since it is already connected.

The radio resource layers in the network node may house more connected users. The UE resides in a dormant state. This is agreed to be as a state where the UE is fairly inactive and where the dominating bulk of data sessions are known to be initiated by the UE. It is also a state wherein the latency requirements of any network initiated data sessions are on par with that required for paging and incoming calls such as that of Idle Mode. It is known to the network that the user planes associated with the UE remain dormant unless the UE makes an explicit request, such as on the random access channels, to leave the dormant state. There are at least two advantages of this approach. First, the random access channel and the associated signaling have a high priority in a typical scheduler of radio transmission opportunities. Scheduler schemes also usually have fairness flavors that increase the weight for a user that has not been scheduled for a while. This means that no additional scheduler policies are required to treat a UE that wants to move to a state associated with higher activity, or get urgent and quick access to send handover measurements. The second implication is that the resource management methods in the network node may use less costly methods to manage the UE, from the moment it enters the dormant state until it leaves, e.g. move its context to a specific part of memory used for contexts of UEs that are Idle and just on duty to receive paging calls.

In one exemplary embodiment, a method may include preconfiguring, by a UE, the UE for DRX operation in a connected state. Further, the DRX operation may include DRX operation modes with each mode corresponding to a level of connectivity of the UE. While the UE is in the connected state, the method may include determining, by the UE, the level of connectivity of the UE and sending, by the UE, to a network node, a request associated with the DRX operation. Also, the request may include an indication of the level of connectivity of the UE.

In another exemplary embodiment, the request associated with the DRX operation may include a request to start DRX operation.

In another exemplary embodiment, the request associated with the DRX operation may include a request to continue DRX operation.

In another exemplary embodiment, the request to continue DRX operation may include an indication of a change in the level of connectivity of the UE.

In another exemplary embodiment, the method may include monitoring, by the UE, a connection between the UE and the network node. Further, in response to determining a change in the connection, the method may include sending, by the UE, to the network node, a request to stop DRX operation.

In another exemplary embodiment, the change in the connection may be associated with at least one of a handoff or a handover.

In another exemplary embodiment, the method may include monitoring events associated with the connection.

In another exemplary embodiment, the method may include monitoring a quality of the connection.

In another exemplary embodiment, the method may include monitoring radio measurements of the connection.

In another exemplary embodiment, the method may include sending the request associated with the DRX operation responsive to initiating, by the UE, a random access procedure.

In another exemplary embodiment, the method may include sending the request associated with the DRX operation responsive to sending, by the UE, to the network node, a request to be scheduled.

In another exemplary embodiment, the level of connectivity of the UE may include a first level of connectivity associated with a first mode of DRX operation and a second level of connectivity associated with a second mode of DRX operation.

In one exemplary embodiment, a UE may be configured to include a computing device. Further, the computing device may be configured to preconfigure the UE for DRX operation in a connected state. Further, the DRX operation may include modes of DRX operation with each mode corresponding to a level of connectivity of the UE. While the UE is in the connected state, the computing device may be configured to determine the level of connectivity of the UE and send, to a network node, a request associated with the DRX operation. Also, the request associated with the DRX operation may include an indication of the level of connectivity of the UE.

In another exemplary embodiment, the processor and the memory may be further configured to monitor, by the UE, a connection between the UE and the network node. In response to determining a change in the connection, the processor and the memory may be further configured to send, by the UE, to the network node, a request to stop the DRX operation.

In one exemplary embodiment, a non-transitory computer-readable medium may be encoded with a computer program. The computer program may include computer-executable instructions that when executed by a processor of a UE causes the processor to perform operations. The operations may be configured to preconfigure, by the UE, the UE for DRX operation in a connected state. Further, the DRX operation may include modes of DRX operation with each mode corresponding to a level of connectivity of the UE. While the UE is in the connected state, the operations may be configured to determine, by the UE, the level of connectivity of the UE and to send, by the UE, to a network node, a request associated with the DRX operation. Also, the request associated with the DRX operation may include an indication of the level of connectivity of the UE.

In another exemplary embodiment, the operations may be further configured to monitor, by the UE, a connection between the UE and the network node. In response to determining a change in the connection, the operations may be further configured to send, by the UE, to the network node, a request to stop the DRX operation.

In one exemplary embodiment, a UE may include means for preconfiguring the UE for the DRX operation in a connected state. Further, the DRX operation may include DRX operation modes with each mode corresponding to a level of connectivity of the UE. While the UE is in the connected state, the UE may include means for determining the level of connectivity of the UE and means for sending, to a network node, a request for the DRX operation, including an indication of the level of connectivity of the UE.

In another exemplary embodiment, the UE may include means for monitoring a connection between the UE and the network node. In response to determining a change in the connection, the UE may include means for sending, to the network node, a request to stop the DRX operation.

In one exemplary embodiment, a method may include receiving, by a network node, from a UE operating in a connected state, a request to start discontinuous receive (DRX) operation. Further, the request may include an indication of a level of connectivity of the UE. The method may include selecting, by the network node, one of a plurality of DRX operation modes associated with the level of connectivity. Also, the method may include sending, by the network node, to the UE, a response that activates the selected DRX operation mode of the UE.

In another exemplary embodiment, the method may include sending the response responsive to verifying that a network policy associated with the UE allows for the selected DRX operation mode.

In one exemplary embodiment, a network node may be configured to include a computing device. The computing device may be configured to receive, from a user terminal (UE) operating in a connected state, a request to start discontinuous receive (DRX) operation. Further, the request to start DRX operation may include an indication of a level of connectivity of the UE. The computing device may be configured to select one of a plurality of DRX operation modes associated with the level of connectivity. Also, the computing device may be configured to send, to the UE, a response that activates the selected DRX operation mode of the UE.

In another exemplary embodiment, the computing device may be configured to send the response responsive to verifying that a network policy associated with the UE allows for the selected DRX operation mode.

In one exemplary embodiment, a non-transitory computer-readable medium may be encoded with a computer program. The computer program may include computer-executable instructions that when executed by a processor causes the processor to perform operations. The operations may be configured to receive, by a network node, from a user terminal (UE) operating in a connected state, a request to start discontinuous receive (DRX) operation. Further, the request to start DRX operation may include an indication of a level of connectivity of the UE. The operations may be configured to select, by the network node, one of a plurality of DRX operation modes associated with the level of connectivity. Also, the operations may be configured to send, by the network node, to the UE, a response that activates the selected DRX operation mode of the UE.

In another exemplary embodiment, the operations may be configured to send the response responsive to verifying that a network policy associated with the UE allows for the selected DRX operation mode.

In one exemplary embodiment, a network node may include means for receiving, from a UE operating in a connected state, a request for the DRX operation. The request may include an indication of a level of connectivity of the UE. Further, the network node may include means for selecting one of a plurality of DRX operation modes that is associated with the level of connectivity. Also, the network node may include means for sending, to the UE, a response to activate the selected DRX operation mode of the UE.

In another exemplary embodiment, the network node may include means for sending the response responsive to verifying that a network policy associated with the UE allows for the selected DRX operation mode.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 4 shows an extract from the RRC IE DRX-Config (3GPP TS 36.331) showing various standard timers involved to define the Active Time in Connected Mode.

FIG. 5 shows the RRC IE onDurationTimer (3GPP TS 36.331).

FIG. 6 shows another extract from the RRC IE DRX-Config (3GPP TS 36.331) where the period is 10 msec., 20 msec., etc.

FIG. 7 shows RRC IE PCCH-Config (3GPP TS 36.331) where the period is by 320 msec., 640 msec., etc.

FIG. 8 shows RRC IE TimeAlignmentTimer (3GPP TS 36.331).

FIG. 9 shows RRC IE SchedulingRequestConfig with choice release (3GPP TS 36.331).

DETAILED DESCRIPTION

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

One insight to consider when viewing this disclosure is that most traffic in modern 3GPP networks may be mobile Internet traffic and, to a large extent, may be triggered by higher layer applications in a UE. This insight may also map to scenarios envisioned for the next generation of radio technologies housing masses of MTC devices that may be dormant for lengthy periods of time.

Another insight to consider is the relaxed state of connectivity between the UE and the eNB. In this relaxed state, the UE may remain on a paging channel in the RRC_CONNECTED state and may use the random access channel to send, to the eNB, a request to be scheduled. Further, this relaxed state may be characterized as DORMANT in the RRC_CONNECTED state. DORMANT in the RRC_CONNECTED state may include a UE context being stored in the eNB. Further, the UE and the eNB may have an RRC connection. Also, a UE-specific Connected Mode DRX operation may be configured and network controlled mobility may be active. In addition, the UE may acquire system information, may monitor PDCCH to detect incoming calls or system information changes, may monitor PDCCH to determine if data is scheduled for it, may perform cell measurements or measurement reporting, or may apply Connected DRX if configured.

A person of ordinary skill will recognize that this relaxed state is similar to an RRC_IDLE state. In fact, this relaxed state may also be characterized as DORMANT in RRC_IDLE state. DORMANT in an RRC_IDLE state may include a default Idle Mode DRX operation being broadcast in system information. Further, a UE-specific Idle Mode DRX operation may be configured. In addition, the UE may acquire system information, may monitor PDCCH to detect incoming calls or system information changes, or may apply Idle Mode DRX operation if configured.

Figure 1:
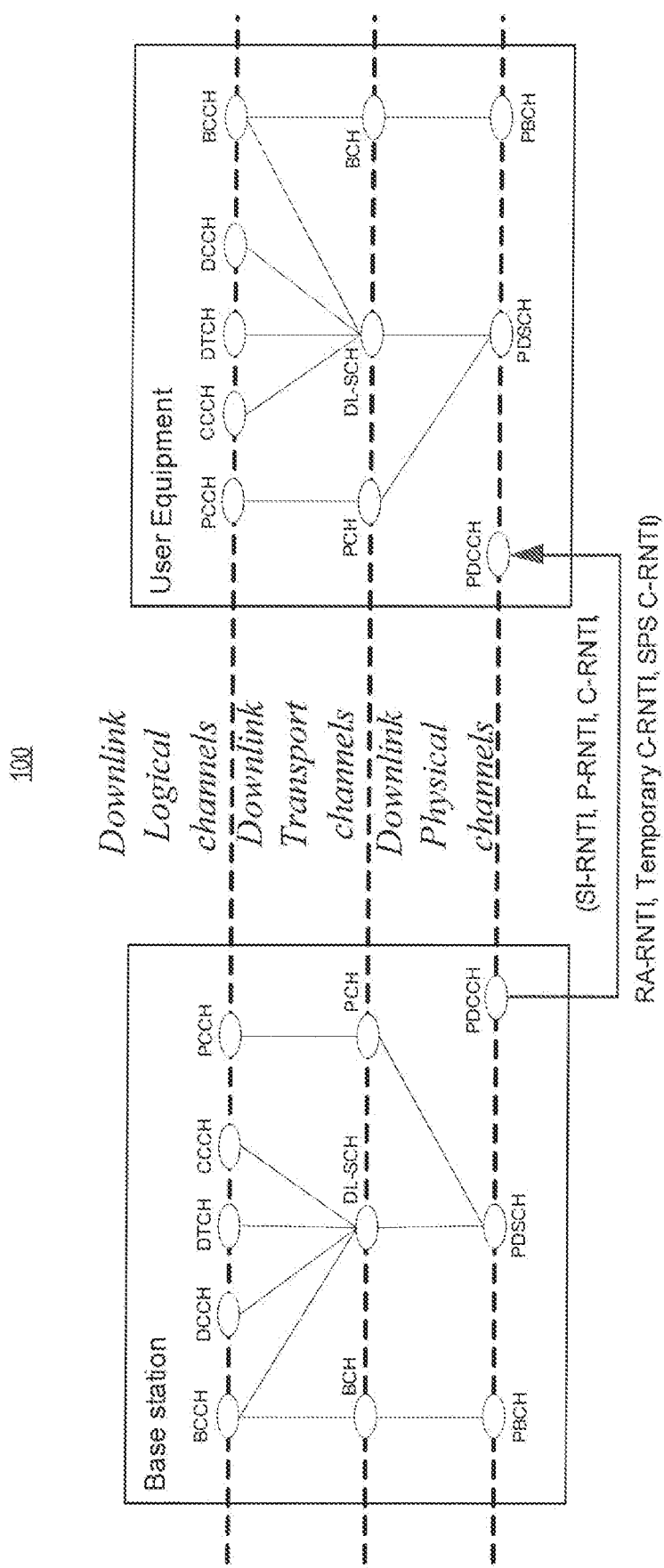
FIG. 1 illustrates an LTE system using PDCCH.
Figure 2:
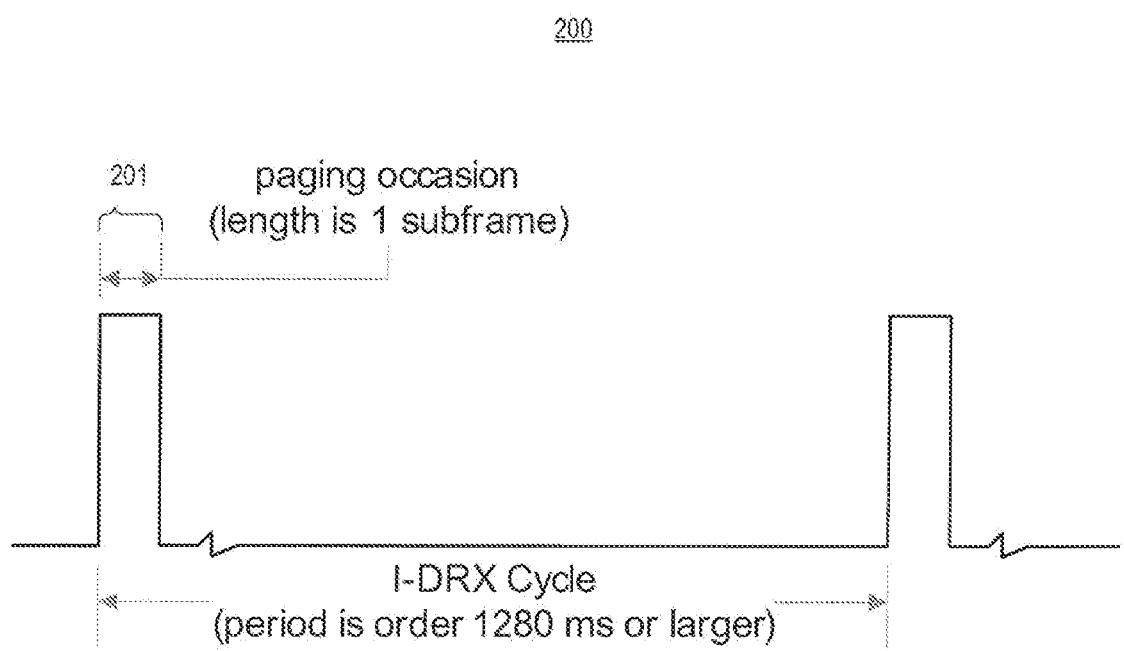
FIG. 2 illustrates a DRX cycle of PDCCH for a UE in Idle Mode.
Figure 3:
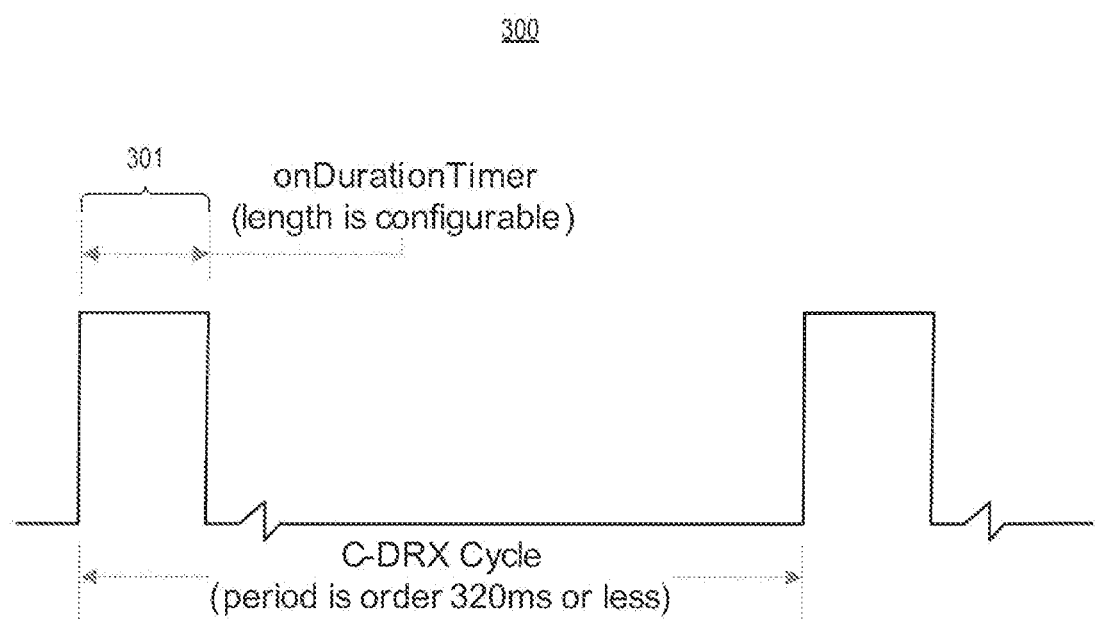
FIG. 3 illustrates a DRX cycle for a UE in Connected Mode.
Figure 10:
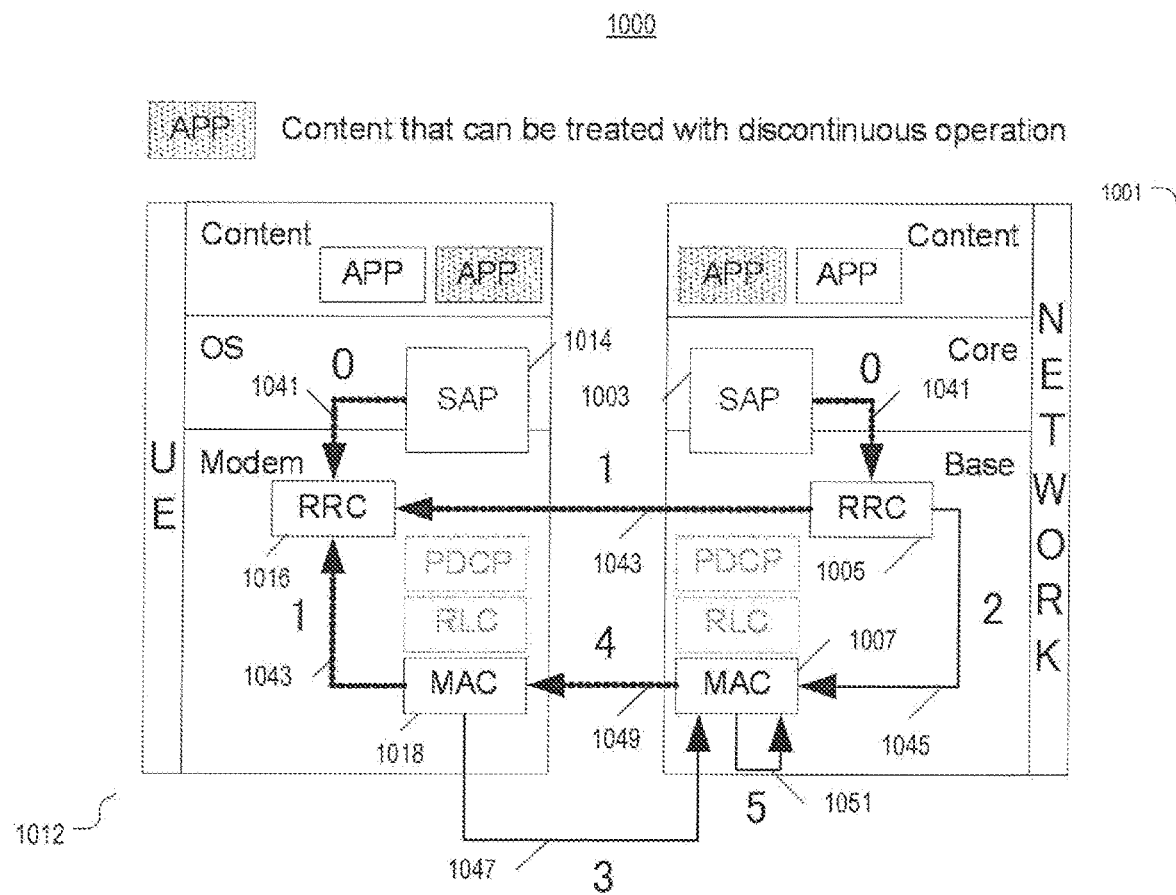
FIG. 10 illustrates one embodiment of a system for performing DRX operation in accordance with various aspects as described herein.

FIG. 10 illustrates a system 1000 of performing DRX operation such as dormant DRX operation in LTE connected mode in accordance with various aspects described herein. In FIG. 10, the system 1000 may include a network node 1001 and a UE 1012. The network node 1001 may include one or more network nodes such as a base station, a core network node, or the like. The network node 1001 may be configured to include a Service Aware Proxy (SAP) component 1003, a Radio Resource Control (RRC) component 1005, a Medium Access Control (MAC) component 1007, or a like component. The UE 1012 may be configured to include a SAP component 1014, an RRC component 1016, a MAC component 1018, or a like component. In a preconfiguration step 1041, the UE 1012 may be designed and preconfigured to use a First Dormant DRX configuration. A method of performing dormant DRX operation for a UE in a connected mode may include performing steps 1041, 1043, 1045, 1047 and 1049.

In a first step 1043, when a PUCCH resource is released as a result of "inactivity," which may occur implicitly through a loss of UL synchronization or by an explicit release command from the network node 1001, and the UE 1012 uses a random access channel (RACH) to send a request to be scheduled, the UE 1012 may start using the First Dormant DRX configuration. The First Dormant DRX configuration may be associated with a degree of activity of the UE 1012, which may also be referred to as a degree of inactivity of the UE 1012 (i.e., described in a signal or data structure with a presence of a value: value is "0"). An on-duty pattern of the First Dormant DRX configuration may be efficient in conserving power of the UE 1012. In fact, a difference in a power consumption between the First Dormant DRX configuration and an IDLE mode may be small or negligible (i.e., in terms of battery savings, IDLE mode may provide minor benefit).

In a second step 1045, a scheduler component and the RRC component 1005 of the network node 1001 may be adjusted for the First Dormant DRX configuration. The network node 1001 may keep track of events that will make the UE 1012 release PUCCH due to "inactivity," (e.g., loss of UL synchronization, and may only schedule the UE 1012 in subframes that coincide with an Active Time associated with the First Dormant DRX configuration).

In a third step 1047, if the UE 1012 wants to send (or receive) data, it may use a random access procedure to regain UL synchronization or to request to be scheduled. In order to conserve power, the UE 1012 may inform the network node 1001 about the desired DRX state of the UE 1012 by sending an indication of a continued level of connectivity (e.g., activity) of the UE 1012. The UE 1012 may use a part of the "next UL scheduling grant" to send a signal with an indication of the continued level of connectivity of the UE 1012.

In a fourth step 1049, the network node 1001 may select a DRX configuration based on network policies for the UE 1012 and on the continued level of connectivity of the UE 1012, as indicated by the UE 1012. The network node 1001 may select a Second Dormant DRX configuration and may use an explicit command, for which the UE 1012 may be designed and preconfigured to start using the Second Dormant DRX configuration. The Second Dormant DRX configuration may be associated with a lower degree of activity (i.e., described in a signal or data structure with a presence of a value: value is '1', e.g. in the signal of step 3) as compared to what may be typical (e.g. absence of value). The on-duty pattern of the Second Dormant DRX configuration may be matched with a lower degree of activity than the First Dormant DRX configuration. The network node 1001 may enable the UE 1012 to enter dormant DRX and the network node 1001 may apply the pre-agreed dormant DRX setting in the scheduler. The UE 1012 may turn off its receiver during the configured sleeping periods.

In a fifth step 1051, the scheduler component and the RRC component 1005 in the network node 1001 may be adjusted for the selected DRX configuration. Should the Second Dormant DRX configuration be selected, the scheduler component and the RRC component 1005 in the network node 1001 may be adjusted (e.g. it may schedule the UE 1012 in subframes that coincide with the Active Time associated with the Second Dormant DRX configuration). The network node 1001 may keep track of events that may make the UE 1012 require a different connectivity level due to a change of "activity."

In another embodiment, during the pre-configuration step performed in advance of the first step, the First Dormant DRX configuration may be hardwired in the UE.

In another embodiment, the First Dormant DRX configuration may be broadcast from the eNB to the UE in an RRC signal having system information.

In another embodiment, the First Dormant DRX configuration may be sent from the eNB to the UE in an RRC signal upon establishment of the RRC_CONNECTED state.

In another embodiment, the First Dormant DRX configuration may be sent using a MAC signal.

Figure 11:
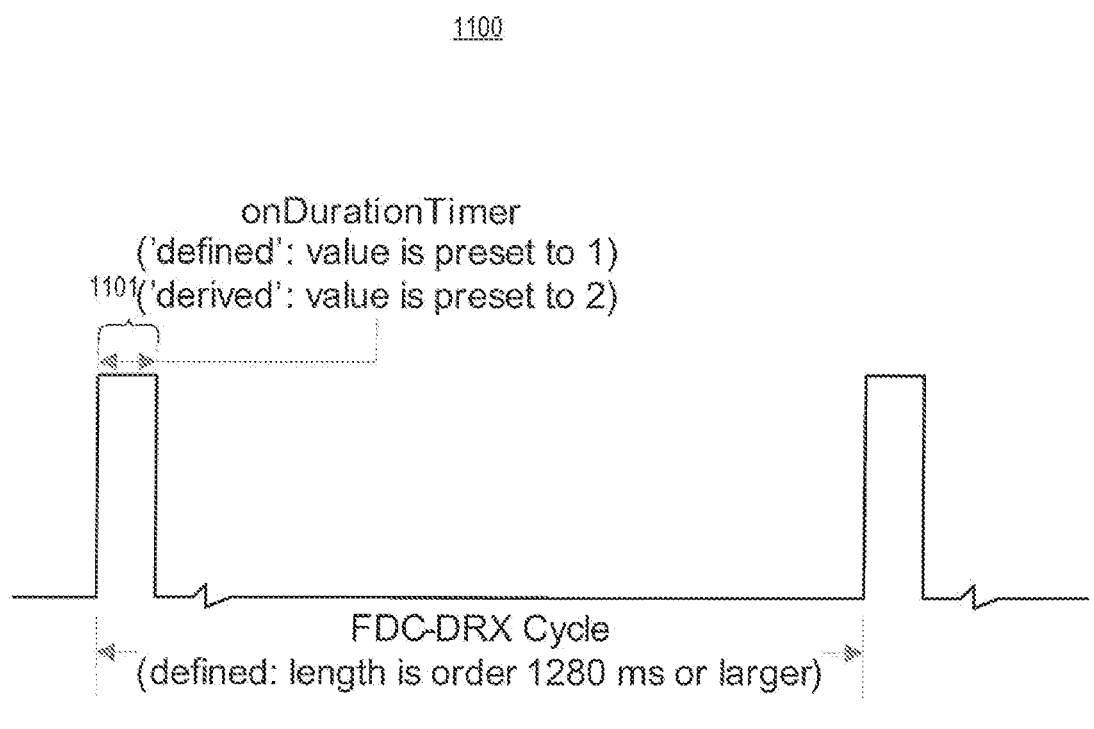
FIG. 11 illustrates one embodiment of a DRX cycle of a First Dormant DRX configuration in accordance with various aspects as described herein.

FIG. 11 illustrates one embodiment of a DRX cycle 1100 of a First Dormant DRX configuration in accordance with various aspects as described herein. In FIG. 11, the DRX cycle 1100 of the First Dormant DRX configuration may be defined by or derived from parameters that define paging cycles in Idle Mode. Such a definition or derivation may enable a spread of the UEs engaged in Dormant DRX operation with regards to how they are paged or reached for network initiated data transmission. The First Dormant DRX configuration may not require that all timers be used for normal DRX operation in Connected Mode, such as the drx-InactivityTimer and the drx-RetransmissionTimer. Hence, the UE's reception duties may be substantially confined to the DL onDurationTimer 1101 opportunities (and possibly to related HARQ retransmission opportunities).

In another embodiment, for the second step, the scheduler component and the resource management component in the network node may keep track of one or more events that may make the UE release PUCCH due to inactivity. A first event may include an expiration of a TimeAlignmentTimer. A second event may include an inactivity trigger to send an explicit command from the network node to the UE. The first event may be defined by the current standard, which mandates that the UE release PUCCH. Further, another event described by this standard mandates that the UE release PUCCH using a threshold counter dsr-TransMax. The threshold counter dsr-TransMax may be used to limit the number of scheduling requests on PUCCH. However, this other event may not make the UE release PUCCH due to inactivity.

In another embodiment, the second event and the network command that makes the UE release PUCCH due to inactivity may use the RRC IE SchedulingRequestConfig component with choice 'release', as illustrated in FIG. 9. The second event may require extended protocols that define the rules to send or receive the command, and that may also carry a signal from some Service Aware Proxy (SAP), e.g. in the UE, in accordance with signals from a Policy and Charging Routing Function (PCRF), e.g. in the operators' core, that defines a sufficient cause to treat the UE as one that supports and may use Dormant DRX operation. Such a SAP may investigate the type of IP content, e.g. with methods that supervise the source APPs for the IP content and may detect that data buffers containing "eye-ball" content or prepaid content have been inactive for a defined period of time. One example of an APP that provides "eye-ball" content is YouTube. The prepaid content may be related to a particular content provider with whom the OEM, that houses the UE, has a Service Level Agreement (SLA).

In another embodiment, the scheduler component and the resource management component in the network node may be adjusted by the scheduler schemes, during times of congestion, using an elevated priority for on-duty phases. The elevated priority for on-duty phases may be a priority that scales inversely with the length of the on-duty phase so that data to be delivered to a user in Dormant DRX operation may pass any other data from a similar stream of L2 processed IP packets configured for the same or similar Quality of Service (QoS). Further, the elevated priority for on-duty phases may be delivered in due time before the on-duty cycle ends. Policies that already exist in many scheduler implementations may be used in lieu of or in conjunction with this method.

In another embodiment, in the third step, the signal with the indication of continued level of connectivity may be subject to a prohibit timer. The UE may not use the indication until a timer expires, e.g., since the last time that the UE used the indication or since the last time that the UE made a transition to the dormant mode. The system may benefit from the use of the prohibit timer. First, a UE that supports Dormant DRX operation may earn a right to use the signal at random access by first proving that the UE is a dormant user. If the UE needs to access before the expiration of the prohibit timer, then the UE may not be acting in convention with the rules of a dormant user. The prohibit timer may guarantee that the user is regarded as a dormant user, and may be capitalized as such in the resource policies that dimensions the network node. Second, the network may use the prohibit timer to further spread the load of dormant users so that they do not access in the same moment (RA occasion).

In another embodiment, the next UL scheduling grant of the third step may be the next UL grant that is assigned for the Temporary C-RNTI of the UE, i.e., that which may be provided in RAR for Random Access Msg3.

In another embodiment, the next UL scheduling grant of the third step may be the next UL grant that is assigned to the C-RNTI of the UE. One advantage of this embodiment is that the network may hold back the grant for UEs for which Dormant DRX operation is not supported or has not been configured, and thus poll the indication of continued level of connectivity exclusively for those UEs that support the Dormant DRX operation based on the C-RNTI it sends in Msg3.

Figure 12:
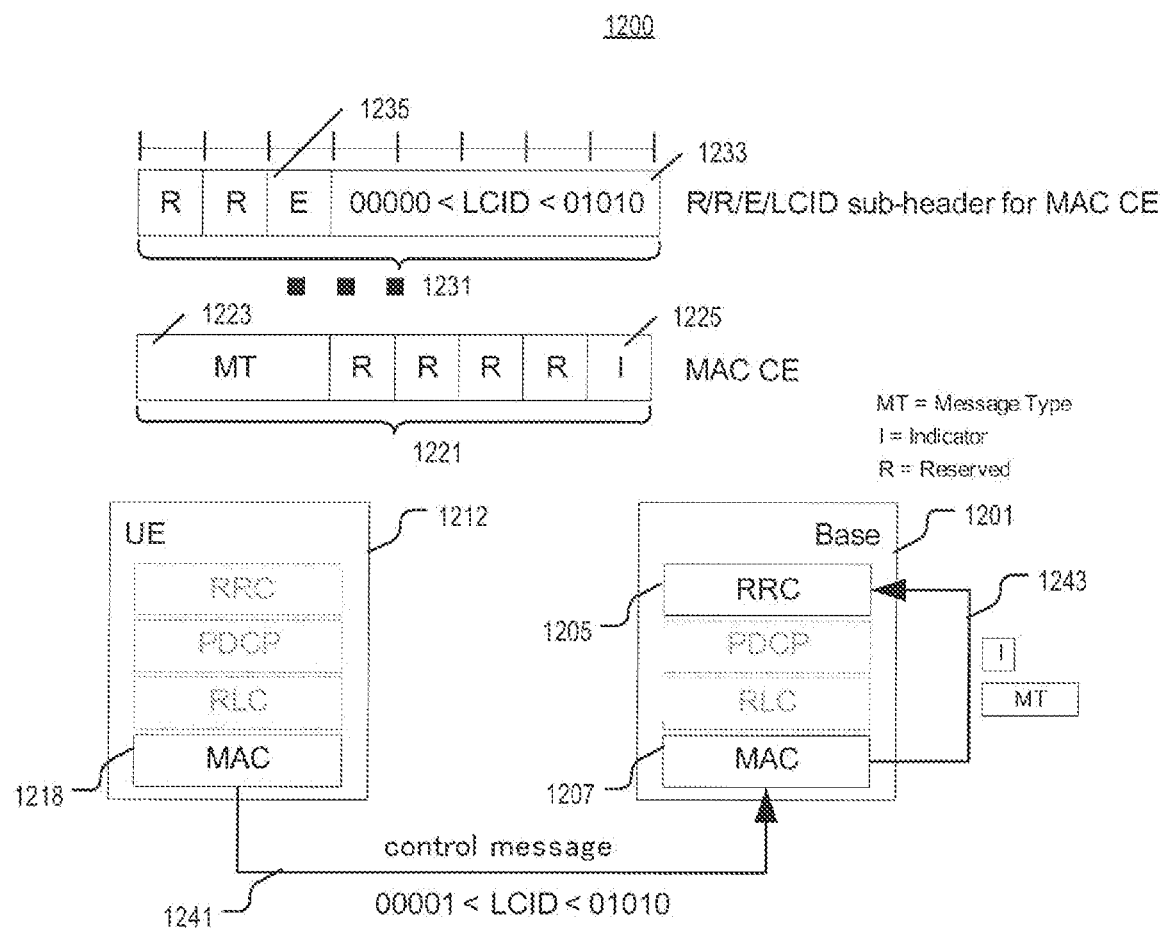
FIG. 12 illustrates another embodiment of a system for performing DRX operation in accordance with various aspects as described herein.

FIG. 12 illustrates another embodiment of a system 1200 of performing DRX operation in accordance with various aspects as described herein. In FIG. 12, the system 1200 may include a network node 1201 and a UE 1212. The network node 1201 may include one or more network nodes such as a base station, a core network node, or the like. The network node 1201 may be configured to include an RRC component 1205, a MAC component 1207, or a like component. The UE 1212 may be configured to include a MAC component 1218, or a like component.

In FIG. 12, a signal containing an indication of a continued level of connectivity may be a MAC control element (CE) 1221. The MAC component 1218 of the UE 1212 may send the MAC CE 1221 to the MAC component 1207 of the network node 1201, as indicated by reference 1241. The MAC CE 1221 may include a Message Type (MT) field 1223, an indicator (I) field 1225, a Reserved (R) field, or the like. Further, a sub-header 1231 may be associated with the MAC CE 1221. The sub-header 1231 may include a Logical Channel ID (LCID) field 1233, an Extension (E) field 1235, an R field, or the like. The LCID field 1233 may instruct the MAC component 1207 in the network node 1201 to send the MAC CE 1221 to the RRC component 1205 in the network node 1201, as indicated by reference 1243. Further, the RRC component 1205 of the network node 1201 may receive the indication of the continued level of connectivity from the MAC component 1207 of the network node 1201.

In another embodiment, the indication of the continued level of connectivity may be sent from the MAC component of the UE in an RRC signal. In one example, a lower portion of an LCID range (e.g., [00000-01010]) may be reserved for logical channels that have been configured by the RRC component of the network node. Further, an upper portion of the LCID range (e.g., [11010-11111] for DL-SCH and [11001-11111] for UL-SCH) may be reserved for MAC CEs. Any use of a value in the lower range that has not been configured by a higher layer may be used to send commands that are not yet specified and may not conflict with future use of a standard.

In another embodiment, the UE may determine to leave the Dormant DRX operation and may return to normal DRX operation. For example, the SAP component of the UE may determine to leave the Dormant DRX operation and return to normal DRX operation by using methods to investigate the type of IP content or by supervising the source APPs for the IP content and may detect that the data buffers are again filled with data that likely will increase the user plane activity and that would require an increased connectivity level. In another example, the SAP component of the UE may determine to leave the Dormant DRX operation and return to normal DRX operation by the SAP components of the UE being engaged in placing or responding to a Voice over LTE (VoLTE) call. In another example, the RRC component in the UE may recognize a mobility situation, which calls for an increased level of activity. One example of data that may require an increased connectivity level is that which belongs to "eye-ball" content. Another example is data that may be prepaid and belongs to Service Level Agreement (SLA) content as defined between the OEM and a content provider.

In another embodiment, the pre-configuration performed prior to the fourth step may include the Second Dormant DRX configuration being hardwired in the UE.

In another embodiment, the Second Dormant DRX configuration may be broadcast from the network node to UEs by an RRC signal with system information.

In another embodiment, the Second Dormant DRX configuration may be sent from the network node to the UE in an RRC signal upon the establishment of the RRC_CONNECTED state.

In another embodiment, the Second Dormant DRX configuration may be sent using a MAC signal.

Figure 13:
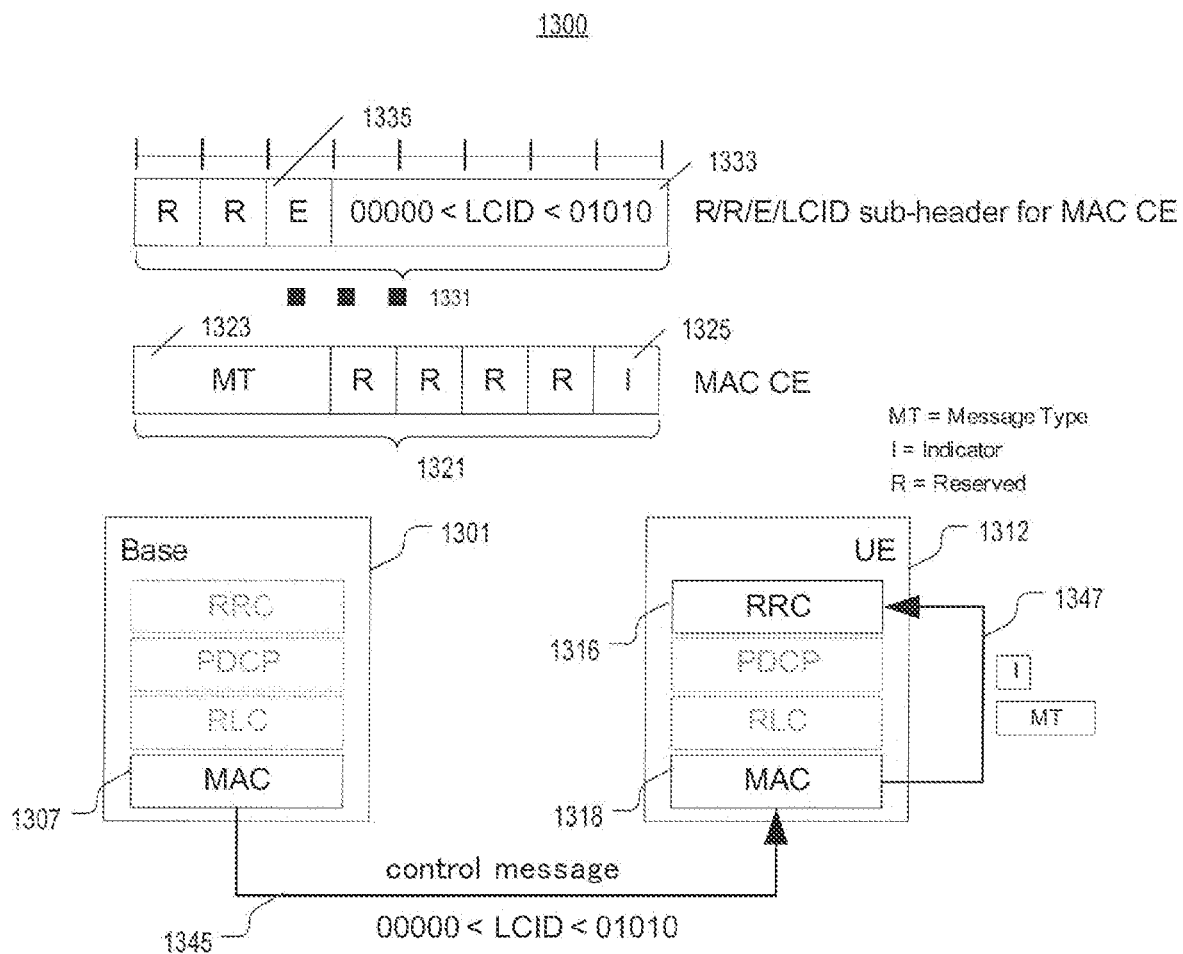
FIG. 13 illustrates another embodiment of a system for performing DRX operation in accordance with various aspects described herein.

FIG. 13 provides another embodiment of a system 1300 for performing DRX operation in accordance with various aspects described herein. In FIG. 13, the system 1300 may include a network node 1301 and a UE 1312. The network node 1301 may include one or more network nodes such as a base station, a core network node, or the like. The network node 1301 may be configured to include a MAC component 1307, or a like component. The UE 1312 may be configured to include an RRC component 1316, a MAC component 1318, or a like component.

In FIG. 13, a signal containing a command to start using a Second Dormant DRX configuration may be a MAC CE 1321. The MAC component 1307 of the network node 1301 may send the MAC CE 1321 to the MAC component 1318 of the UE 1312, as indicated by reference 1345. If the command is not received by the UE 1312, the typical DRX operation of the UE 1312 may be employed. The MAC CE 1321 may include an MT field 1323, an I field 1325, an R field, or the like. Further, a sub-header 1331 may be associated with the MAC CE 1321. The sub-header 1331 may include an LCID field 1333, an E field 1335, an R field, or the like. The LCID field 1333 may instruct the MAC component 1318 of the UE 1312 to send the MAC CE 1321 to the RRC component 1316 of the UE 1312, as indicated at reference 1347.

Figure 14:
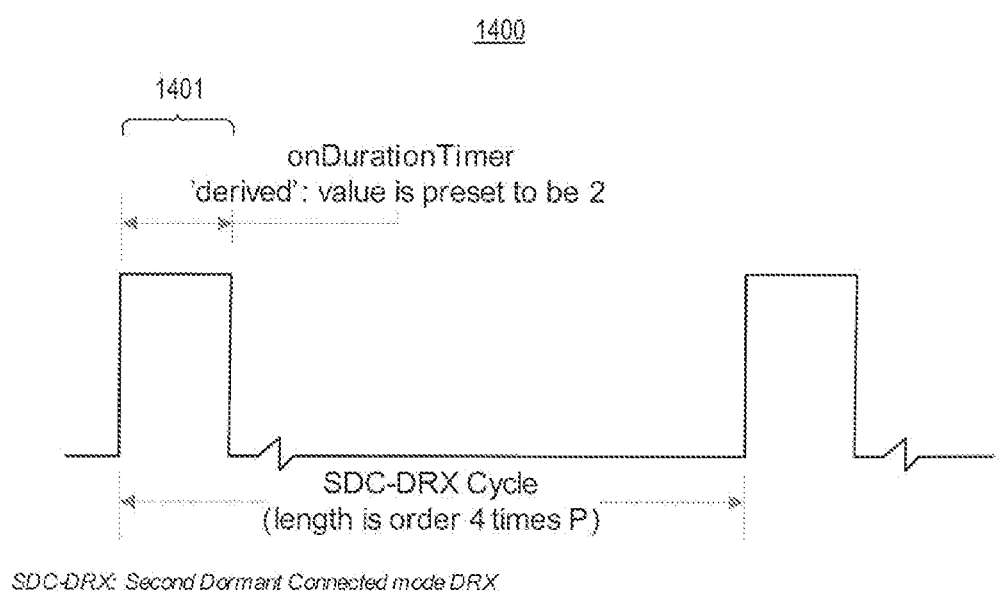
FIG. 14 illustrates one embodiment of a DRX cycle of a Second Dormant DRX configuration in accordance with various aspects as described herein.

FIG. 14 illustrates one embodiment of a DRX cycle 1400 of a Second Dormant DRX configuration in accordance with various aspects as described herein. In FIG. 14, the DRX cycle 1400 of the Second Dormant DRX configuration may be derived from parameters that define the normal DRX operation in connected mode. Hence, the UEs reception duties may be substantially confined to the onDurationTimer 1401.

In another embodiment, embodiments of the fifth step may be similar to those of the second step.

The upper data plane layers in the UE (e.g., Content, OS, PDCP, see FIG. 10) or in the network (e.g., Content, Core, PDCP, see FIG. 10) may use a method that includes monitoring buffer content and detecting a cause to use discontinuous operation. Further, the method may include monitoring the buffer content and detecting a cause to not use discontinuous operation. Buffer content may be defined by the presence of data from some specific source APPs, or the actual content of such APP data, or the headers used by the transport protocols. The detection of a cause to use discontinuous operation may be based on an absence of such data or may use a timer that supervises a time since last receiving a packet with a request to download such data, e.g. corresponding to some important "eye-ball" or prepaid content. The detection of a cause to not use discontinuous operation may be based on a sudden presence of data from some specific source APPs, i.e. the arrival of a packet with a request to download an important "eye-ball" or prepaid content; and The lower data and control plane layers (e.g., RRC, MAC, PHY) in the UE may use a method that includes preconfiguring the UE for Dormant DRX operation in connected mode, with a First Dormant DRX configuration and a Second Dormant DRX configuration. Further, the method may include, if the UE wants to send (or receive) data, and uses a random access procedure to gain or regain UL synch or to request to be scheduled, forwarding a request to start, continue, stop or the like Dormant DRX operation. Further, the request may include an indication of a continued level of connectivity of the UE. The continued level of connectivity may be used to describe a desired level of discontinuous operation of the UE. Further, the method may include monitoring radio measurements (or detections of events related to that) to detect a cause to not use discontinuous operation, since the measurements may trigger a change of serving cell (e.g. handover, handoff, or the like).

The network (Base and Core, see FIG. 10) may use a method that includes receiving, from a UE, a request to start using discontinuous operation. Further, the request may include an indication of a continued level of connectivity of the UE. The indication of the continued level of connectivity of the UE may be used by the network to select a mode of operation such as normal DRX in Idle Mode, normal DRX in connected mode, any Dormant DRX operation in connected mode, or the like. Further, the method may include verifying that network policies associated with the UE allows for using the selected mode of discontinuous operation beyond the normal DRX operation. In response to the request, the method may include sending, by the network, to the UE, a response with a command message that activates discontinuous operation by the UE. Further, the command message may activate the Dormant DRX operation in connected mode.

Moreover, during times of congestion, the scheduler schemes in the network node may use an additional piece of policy so that the method includes elevating a priority for DTCH or DCCH data scheduled to a C-RNTI user, which may be associated with the Dormant DRX operation so that it may pass with a priority normally used for data with diminished scheduler opportunities such as PCCH.

In the aforementioned embodiments, the term "DRX operation" may be replaced with the term "discontinuous operation" and as such may include any other preconfigured or designed radio configurations such as a dedicated preamble for background or MTC users or a dedicated PUCCH SR resource for background or MTC users. Such dedicated resources may be associated with a prohibit timer as previously described (i.e., the UE must first earn the right to use it and the network may use a prohibit timer to spread the load of background users.)

The PUCCH SR resource for background users may be designed in a way that it partly provides opportunities for the UE to save battery and partly provides opportunities for the network to reuse the PUCCH. The UE may be designed and preconfigured to send SR on such a shared PUCCH SR resource, with a predefined guarantee to get a receipt of grant on a subframe N+4, where N=SR opportunity. In that way, the UE has the option to sleep between SR opportunities. For TDD systems, N+4 may not be an UL subframe, in which case the first UL subframe after subframe N+4 may be chosen instead. This method of distributing grants may help conserving battery power of the UE.

There are also certain radio configurations that may be excluded for users that are classified as dormant background users. These are configurations that are designed for high throughput users, e.g. there is no need to aggregate carriers or other bandwidth for a dormant background user, e.g. a dormant user would not need to care for any Scells.

In general, any function that is designed for use in Idle mode may be used to derive similar relaxed functions for Connected mode. An example is mobility procedures and UE measurements required to support cell selection and reselection. Many of these functions may require less power from the UE than the corresponding functions designed for Connected mode.

Figure 15:
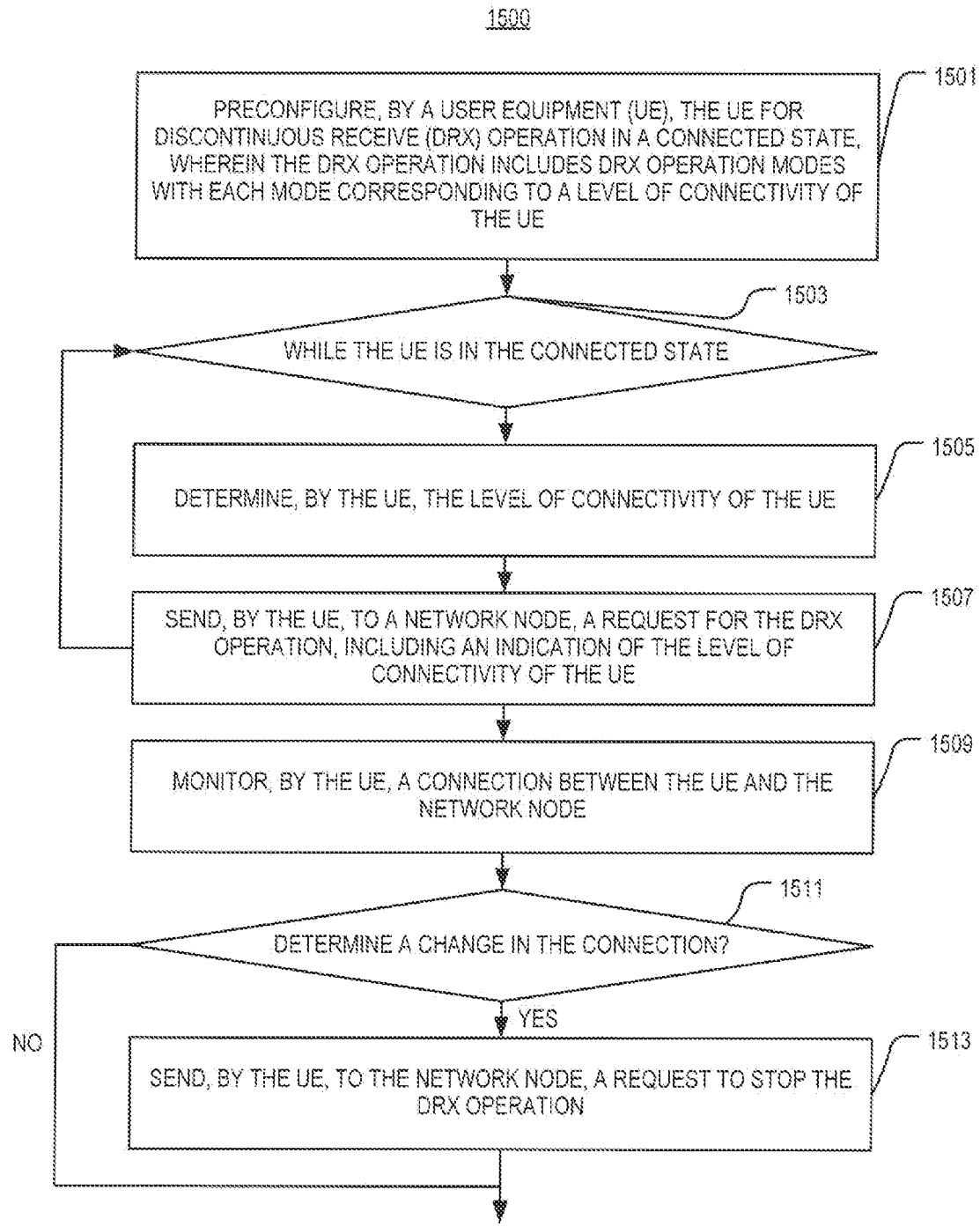
FIG. 15 provides a flowchart of one embodiment of a method of performing discontinuous receive operation by a UE in accordance with various aspects as described herein.

FIG. 15 provides a flowchart of one embodiment of a method 1500 of performing discontinuous receive operation in accordance with various aspects described herein. In FIG. 15, the method 1500 may start, for instance, at block 1501, where it may include preconfiguring, by a UE, the UE for DRX operation in a connected state. Further, the DRX operation may include DRX operation modes with each mode corresponding to a level of connectivity of the UE. While the UE is in the connected state, as represented by block 1503, the method 1500 may perform the steps indicated by blocks 1505 and 1507. At block 1505, the method 1500 may include determining, by the UE, the level of connectivity of the UE. At block 1507, the method 1500 may include sending, by the UE, to a network node, a request for the DRX operation, including an indication of the level of connectivity of the UE.

In FIG. 15, at block 1509, the method 1500 may include monitoring, by the UE, a connection between the UE and the network node. Further, at block 1511, the method 1500 may determine whether there is a change in the connection between the UE and the network node. If there is a change in the connection, at block 1513, the method 1500 may include sending, by the UE, to the network node, a request to stop the DRX operation.

Figure 16:
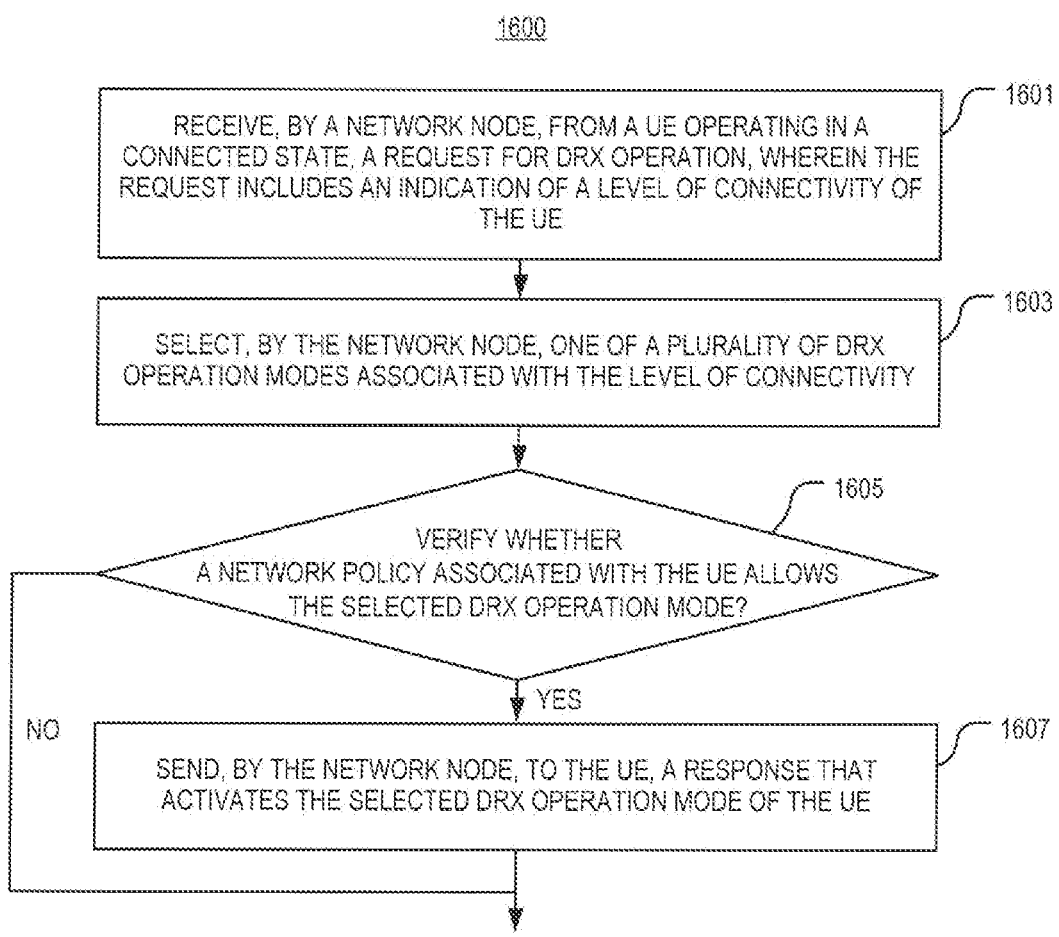
FIG. 16 provides a flowchart of one embodiment of a method of performing discontinuous receive operation by a network node in accordance with various aspects as described herein.

FIG. 18 provides a flowchart of one embodiment of a method 1600 of performing discontinuous receive operation by a network node in accordance with various aspects described herein. In FIG. 16, the method 1600 may start, for instance, at block 1601 where it may include receiving, by the network node, from a UE operating in a connected state, a request for DRX operation. Further, the request may include an indication of a level of connectivity of the UE. At block 1603, the method 1600 may include selecting, by the network node, one of a plurality of DRX operation modes associated with the level of connectivity. At block 1605, the method 1600 may include verifying whether a network policy associated with the UE allows the selected DRX operation mode. In response to determining that the network policy associated with the UE allows the selected DRX operation mode, at block 1607, the method 1600 may include sending, by the network node, to the UE, a response that activates the selected DRX operation mode of the UE.

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used to provide a graphical user interface that facilitates inputting a character into a computing device. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to.

In the previous description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices, systems, or articles of manufacture described herein are in conjunction with discontinuous operation for wireless devices, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims.

What is claimed is:

1. A method, by a user equipment (UE), for performing discontinuous receive (DRX) operation, the method comprising:
   preconfiguring, by the UE, the UE for the DRX operation in a connected state, wherein the DRX operation includes DRX operation modes with each mode corresponding to a level of connectivity of the UE; and
   while the UE is in the connected state:
      determining, by the UE, the level of connectivity of the UE; and
      sending, by the UE and to a network node, a request for the DRX operation, the request including an indication of the level of connectivity of the UE;
   wherein said sending is so as to enable the network node to select one of the DRX operation modes that correspond to the determined level of connectivity.

2. The method of claim 1, wherein the request for the DRX operation includes a request to start the DRX operation.

3. The method of claim 1, wherein the request for the DRX operation includes a request to continue the DRX operation.

4. The method of claim 1, wherein the request for the DRX operation includes an indication of a change in the level of connectivity of the UE.

5. The method of claim 1, further comprising:
   monitoring, by the UE, a connection between the UE and the network node; and
   in response to determining a change in the connection, sending, by the UE and to the network node, a request to stop the DRX operation.

6. The method of claim 5, wherein the change in the connection is associated with at least one of a handoff or a handover.

7. The method of claim 5, wherein monitoring the connection includes monitoring events associated with the connection.

8. The method of claim 5, wherein monitoring the connection includes monitoring a quality of the connection.

9. The method of claim 5, wherein monitoring the connection including monitoring radio measurements of the connection.

10. The method of claim 1, wherein sending the request is responsive to initiating, by the UE, a random access procedure.

11. The method of claim 1, wherein sending the request for the DRX operation is responsive to sending, by the UE, to the network node, a request to be scheduled.

12. The method of claim 1, wherein the level of connectivity includes a first level of connectivity associated with a first mode of the DRX operation and a second level of connectivity associated with a second mode of the DRX operation.

13. The method of claim 1, wherein the level of connectivity is associated with the UE releasing or losing a phyiscal uplink control channel (PUCCH) or the UE sending a scheduling request message on a random access channel (RACH).

14. The method of claim 1, wherein the connected state is associated with the UE having a radio resource control (RRC) connection.

15. The method of claim 1, wherein the indication of the level of connectivity of the UE is represented by a plurality of values of a logical channel identifier of a medium access control element.

16. A user equipment (UE) for performing discontinuous receive (DRX) operation, the UE comprising:
   memory configured to store data and computer-executable instructions; and
   a processing circuit operatively coupled to the memory;
   wherein the processing circuit and the memory are configured to:
      preconfigure the UE for the DRX operation in a connected state, wherein the DRX operation includes modes of the DRX operation with each mode corresponding to a level of connectivity of the UE; and
      while the UE is in the connected state:
         determine the level of connectivity of the UE; and
         send, to a network node, a request for the DRX operation, wherein the request includes an indication of the level of connectivity of the UE;
      wherein said sending is so as to enable the network node to select one of the DRX operation modes that correspond to the determined level of connectivity.

17. The UE of claim 16, wherein the processing circuit and the memory are further configured to:
   monitor, by the UE, a connection between the UE and the network node; and
   in response to determining a change in the connection, send, by the UE, to the network node, a request to stop the DRX operation.

18. A computer program product stored in a non-transitory computer readable medium for controlling a User Equipment (UE) for performing discontinuous receive (DRX) operation, the computer program product comprising software instructions which, when run on a processing circuit of the UE, causes the UE to:
   preconfigure itself for the DRX operation in a connected state, wherein the DRX operation includes modes of the DRX operation with each mode corresponding to a level of connectivity of the UE; and
   while the UE is in the connected state:
      determine the level of connectivity of the UE; and
      send, to a network node, a request for the DRX operation, wherein the request includes an indication of the level of connectivity of the UE;
   wherein said sending is so as to enable the network node to select one of the DRX operation modes that correspond to the determined level of connectivity.

19. The computer program product of claim 18, wherein the software instructions, when run on the processing circuit, further cause the UE to:
   monitor a connection between the UE and the network node; and
   in response to determining a change in the connection, send, to the network node, a request to stop the DRX operation.

20. A method, by a network node, for performing discontinuous receive (DRX) operation, the method comprising:

the network node receiving, from a user terminal (UE) operating in a connected state, a request for the DRX operation, wherein the request includes an indication of a level of connectivity of the UE;

the network node selecting one of a plurality of DRX operation modes that is associated with the level of connectivity of the UE indicated in the received request; and the network node sending, to the UE, a response to activate the selected DRX operation mode of the UE.

21. The method of claim 20, wherein sending the response is responsive to verifying that a network policy associated with the UE allows for the selected DRX operation mode.

22. A network node for performing discontinuous receive (DRX) operation, comprising:

memory configured to store data and computer-executable instructions; and a processing circuit operatively coupled to the memory;

wherein the processing circuit and the memory are configured to:

receive, from a user terminal (UE) operating in a connected state, a request for the DRX operation, wherein the request includes an indication of a level of connectivity of the UE;

select one of a plurality of DRX operation modes that is associated with the level of connectivity of the UE indicated in the received request; and send, to the UE, a response to activate the selected DRX operation mode of the UE.

23. The network node of claim 22, wherein the processing circuit and the memory are further configured to send the response responsive to verifying that a network policy associated with the UE allows for the selected DRX operation mode.

24. A computer program product stored in a non-transitory computer readable medium for controlling a network node for discontinuous receive (DRX) operation, the computer program product comprising software instructions which, when run on a processing circuit of the network node, causes the network node to:

receive, from a user terminal (UE) operating in a connected state, a request to start the DRX operation, wherein the request includes an indication of a level of connectivity of the UE;

select one of a plurality of DRX operation modes that is associated with the level of connectivity of the UE indicated in the received request; and send, to the UE, a response to activate the selected DRX operation mode of the UE.

25. The computer program product of claim 24, wherein the wherein the software instructions, when run on the processing circuit, further cause the network node to send the response responsive to verifying that a network policy associated with the UE allows for the selected DRX operation mode.

* * * * *